(12) United States Patent
Care et al.

(10) Patent No.: US 6,513,332 B2
(45) Date of Patent: Feb. 4, 2003

(54) OIL/AIR BREATHER OUTLET

(75) Inventors: Ian C. D. Care, Derby (GB); Ronald A Midgley, Derby (GB); Michael J Mountney, Long Eaton (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/107,155

(22) Filed: Mar. 28, 2002

(65) Prior Publication Data

US 2002/0178729 A1 Dec. 5, 2002

(30) Foreign Application Priority Data

Apr. 7, 2001 (GB) .............................. 0108771

(51) Int. Cl.$^7$ ................................. F02C 7/06
(52) U.S. Cl. ....................... 60/772; 60/39.08
(58) Field of Search ............... 60/772, 39.08, 60/801

(56) References Cited

U.S. PATENT DOCUMENTS 3,898,793 A * 8/1975 Nakamura et al. ......... 184/6.11
6,116,015 A * 9/2000 Taylor et al. .............. 60/39.08

FOREIGN PATENT DOCUMENTS

| DE | 4 119 794 AB | 12/1992 |
| EP | 0 940 338 A | 9/1999 |
| GB | 2 317 203 A | 3/1998 |
| JP | 2000155075 AB | 6/2000 |

* cited by examiner

Primary Examiner—Ehud Gartenberg
(74) Attorney, Agent, or Firm—W. Warren Taltavull; Manelli Denison & Selter PLLC

(57) ABSTRACT

A breather outlet 10 for discharging a liquid dispersion therefrom comprising an outlet pipe 12 wherein the breather outlet 10 further comprises an electromagnetic wave generator 14 so that, in use, electromagnetic waves produced by the wave generator 14 impart sufficient electromagnetic energy to the liquid dispersion to evaporate at least a portion thereof.

9 Claims, 1 Drawing Sheet

OIL/AIR BREATHER OUTLET

This invention relates to an arrangement for an oil/air breather outlet and in particular although not exclusively an oil/air breather outlet for a gas turbine engine.

During the normal operation of a gas turbine engine a bearing chamber of such an engine normally contains a lubricating oil. The bearing chamber is held under a negative pressure to ensure oil does not undesirably escape from the bearing chamber into the rest of the engine. To maintain a negative pressure therein, air is bled out of the bearing chamber, however, an amount of oil in the form of droplets or particles is also removed with the air. This liquid dispersion, a mixture of air and oil droplets, is then passed to an oil/air separator. The separated oil is returned to the lubrication system while the air is discharged overboard, through the breather assembly. However, not all the oil is removed from the air which is exhausted overboard. This oil/air mixture has the appearance of smoke or steam and which has been mistakenly assumed to be an engine fault.

It is the object of the present invention to provide apparatus to obviate the above problem.

According to the present invention there is provided a breather outlet for discharging a liquid dispersion therefrom comprising a outlet pipe wherein the breather outlet further comprises an electromagnetic wave generator so that, in use, electromagnetic waves produced by the wave generator impart sufficient electromagnetic energy to the liquid dispersion to evaporate at least a portion thereof.

Preferably the breather outlet comprises a wave-guide, wave-guide is so configured that, in use, it focuses the electromagnetic energy, produced by the wave generator, into the outlet pipe whereby the waves impart energy to the liquid dispersion.

Preferably the breather outlet comprises a containment device for containing the electromagnetic waves.

Preferably the electromagnetic wave generator generates electromagnetic energy selected from any one of the group comprising microwaves, ultrasonic waves, infrared radiation and gamma rays.

Preferably the liquid dispersion comprises oil and the liquid is in a particulate form.

Preferably a gas turbine engine comprises a breather outlet as described herein.

Preferably a method of operating a gas turbine engine, the engine comprising a breather outlet as set out in the preceding paragraphs, a weight-on-wheels signal and a power supply for providing power to a wave generator, the method comprising the steps of: enabling the power supply to the wave generator of the breather outlet at engine start-up; disabling the power supply when the weight-on-wheels signal switches off; enabling the power supply when the weight-on-wheels signal switches on. Furthermore it is preferred that the method comprises the step of disabling the power supply at engine shutdown.

The present invention will now be described, by way of example, with reference to the accompanying drawings in which.

Figure 1:
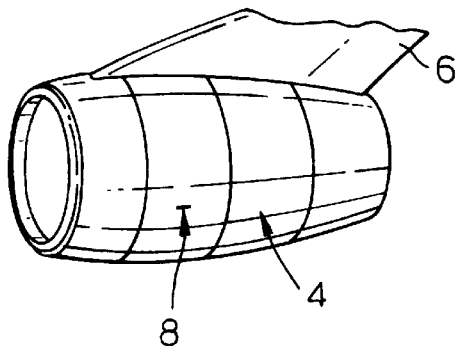
FIG. 1 is a general view of an aircraft mounted gas turbine engine nacelle incorporating a breather outlet in accordance with the present invention.

With reference to FIG. 1, a gas turbine engine nacelle 4 containing a propulsive gas turbine engine is suspended from and aircraft (not shown) by means of a mounting pylon 6. The gas turbine engine within the nacelle 4 is provided with an oil or lubrication system (not shown), as known in the art, which maintains a supply of oil to engine components such as a gearbox (not shown), a scavenge pump (not shown) and bearing chambers (not shown). It is necessary to have a breather assembly 8 to provide communication between the interior and exterior of the engine so that the oil system components do not incur an undesirable build up of air pressure therein.

Figure 2:
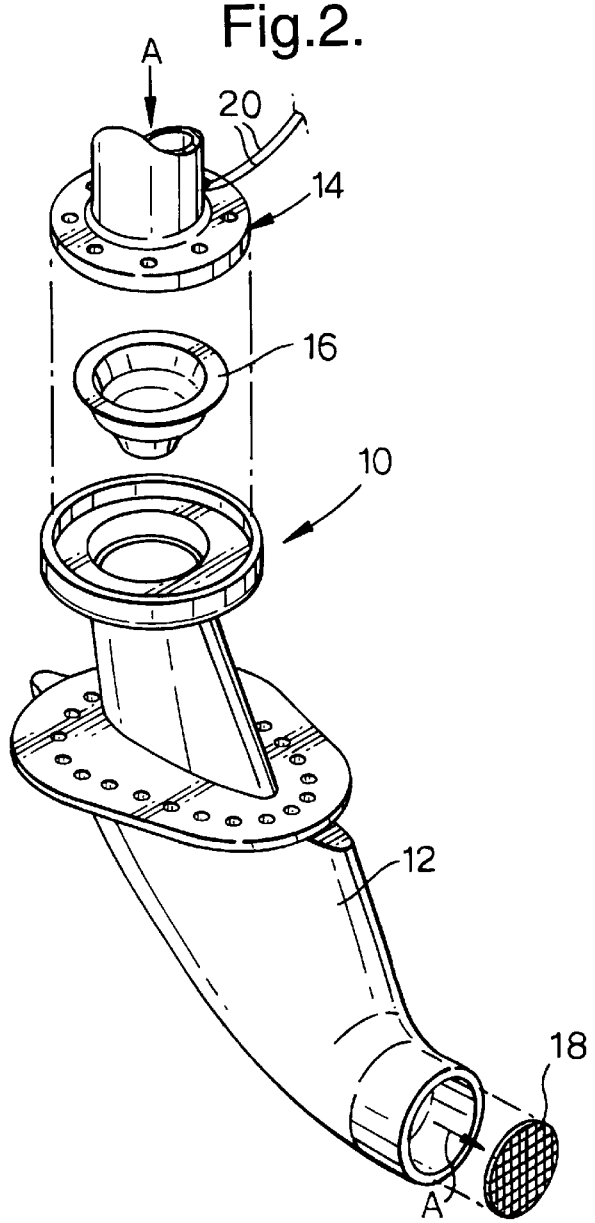
FIG. 2 is an exploded isometric view of the breather outlet in accordance with the present invention.

With reference to FIG. 2, the air/oil breather assembly 8 comprises a breather outlet 10. The breather outlet 10 comprises an outlet pipe 12 for discharging a fluid flowing in the direction indicated by arrow B, an electromagnetic wave generator 14 and a wave guide 16. The breather outlet 10 may also include a wave containment device 18, which in this embodiment is in the form of a wire mesh. The containment wire mesh 18 prevents the microwaves exiting the outlet pipe 12. The wave generator 14 is connected via leads 20 to a switchable power source (not shown) on the engine or aircraft.

During the normal operation of the gas turbine engine the bearing chamber, containing lubricating oil is held under a negative pressure to ensure that the oil does not undesirably escape from the bearing chamber and into the remaining engine. To maintain the negative pressure therein, air is bled out of the bearing chamber, however, an amount of oil in the form of droplets or particles is also removed. This liquid dispersion, a mixture of air and oil droplets, is then passed to an oil/air separator (not shown). The separated oil is returned to the lubrication system while the air is discharged overboard, through the breather assembly 8 and breather outlet 10. However, not all the oil is removed from the air which is exhausted overboard. This oil/air mixture has the appearance of smoke or steam and which has been mistaken to be a problem with the engine. This is particularly so when the aircraft is stationary or moving relatively slowly. At higher aircraft speeds the oil/air mixture is sufficiently and quickly diluted by the passing ambient air flow.

The present invention comprises the breather outlet 10 configured to produce a flux of electromagnetic radiation which is arranged to impart sufficient energy to the oil droplets to substantially evaporate them and thereby make the oil/air mixture substantially invisible.

It is a preferred embodiment of the present invention to use a microwave generator 14 although a generator 14 generating ultrasonic waves, infrared radiation or gamma rays could be used. A wave guide 16 may be provided to further focus the electromagnetic waves on to the liquid dispersion. The microwaves impinge on the oil droplets, agitating and heating the oil causing it to evaporate and thus become invisible to the naked eye. Although it is preferred to heat the droplets until they completely evaporate, it is not necessary to fully evaporate the droplets and merely reducing them in size is sufficient. The overall object being to render the discharged oil/air mixture substantially invisible.

In practice the wave generator 14 need only operate when a weight-on-wheels signal (as known in the art) is on and therefore shows the aircraft is in contact with the ground, since during take-off and flight the air flow around the engine provides sufficient dilution for the air/oil mixture not to be visible. As an alternative to using the weight-on-wheels signal, a signal from an undercarriage stowed indicator is equally effective. Either of these two signals is usable to switch on or off a power supply to the microwave generator 14. Thus a method of operating the breather assembly comprises the steps of enabling a power supply to the wave generator of the breather outlet at engine start-up, disabling the power supply when the weight-on-wheels signal switches off and enabling the power supply when the weight-on-wheels signal switches on. A further step in the aforementioned method of operating the breather assembly comprises disabling the power supply on engine shutdown.

It is an advantage of the present invention that the breather outlet 10 is applicable to new and in-service engines without a significant configuration change.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A breather outlet for discharging a liquid dispersion therefrom comprising a outlet pipe wherein the breather outlet further comprises an electromagnetic wave generator so that, in use, electromagnetic waves produced by the wave generator impart sufficient electromagnetic energy to the liquid dispersion to evaporate at least a portion thereof.

2. A breather outlet as claimed in claim 1 wherein the breather outlet comprises a wave guide, the wave guide is so configured that, in use, it focuses the electromagnetic energy, produced by the wave generator, into the outlet pipe whereby the waves impart energy to the liquid dispersion.

3. A breather outlet as claimed in claim 1 wherein the breather outlet comprises a containment device for containing the electromagnetic waves.

4. A breather outlet as claimed in claim 1 wherein the electromagnetic wave generator generates electromagnetic energy selected from any one of the group comprising microwaves, ultrasonic waves, infrared radiation and gamma rays.

5. A breather outlet as claimed in claim 2 wherein the liquid dispersion comprises oil.

6. A breather outlet s claimed in claim 2 wherein the liquid is in a particulate form.

7. A gas turbine engine comprising a breather outlet as claimed in claim 1.

8. A method of operating a gas turbine engine, the engine comprising a breather outlet as claimed in claim 1, a weight-on-wheels signal and a power supply for providing power to a wave generator, the method comprising the steps of: enabling the power supply to the wave generator of the breather outlet at engine start-up; disabling the power supply when the weight-on-wheels signal switches off; enabling the power supply when the weight-on-wheels signal switches on.

9. A method of operating a gas turbine engine having a breather outlet as claimed in claim 8 comprising the step of disabling the power supply at engine shutdown.

* * * * *